Figures 1, 2:
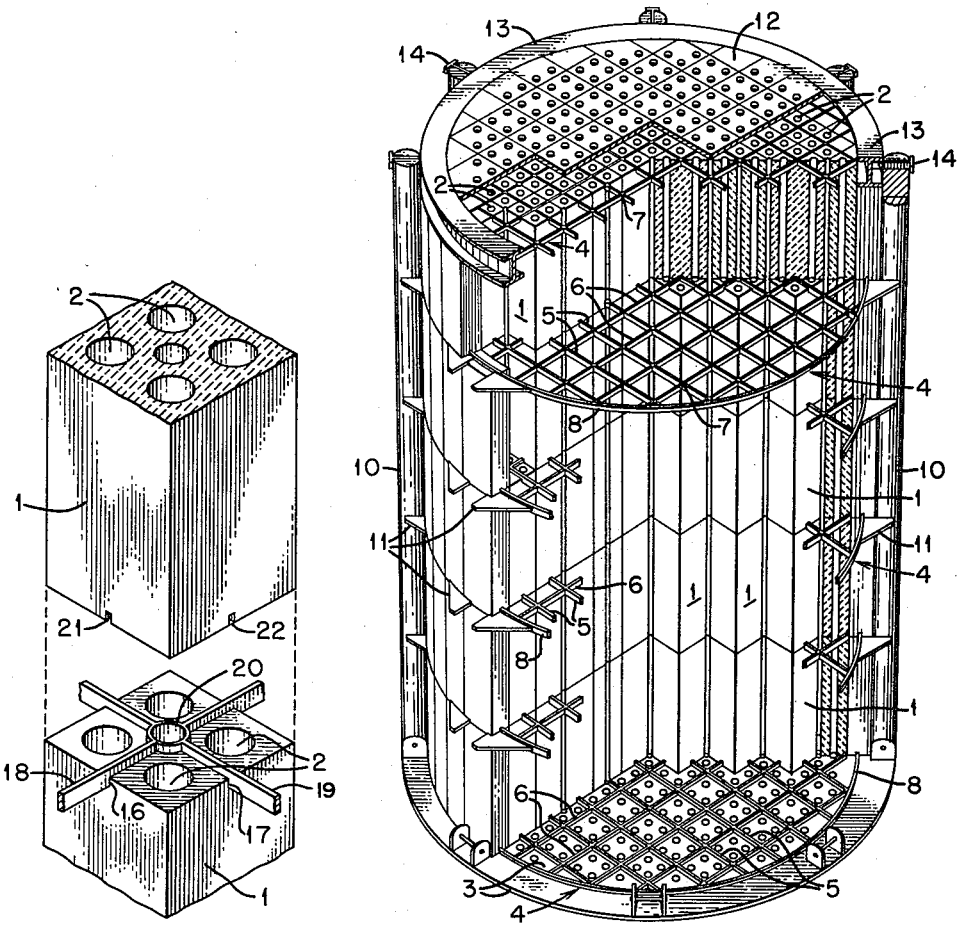

INVENTOR.
Bill L. Greenstreet

ATTORNEY

United States Patent Office 3,116,214
Patented Dec. 31, 1963

3,116,214
REACTOR MODERATOR STRUCTURE
Bill L. Greenstreet, Oak Ridge, Tenn., assignor to the United States of America as represented by the United States Atomic Energy Commission
Filed May 19, 1961, Ser. No. 111,414
2 Claims. (Cl. 176—84)

The present invention relates generally to the neutronic reactor art, and more particularly to means for maintaining the alignment of moderator blocks in such reactors.

The cores of many heterogeneous reactors comprise a multiplicity of moderator blocks stacked in a multiplicity of layers in such a manner so as to form a structure of vertically-stacked parallel columns of blocks. Each block is provided with one or more channels passing vertically therethrough for the acceptance of fuel elements, control rods, experimental apparatus, and for the conduction of a coolant. The blocks are stacked so that these channels are aligned with respect to each other, thus providing continuous vertical passageways through the core.

During reactor operation dimensional changes occur within these moderator blocks causing misalignment of the above-mentioned passageways. First, thermal expansion occurs, and since coefficient of thermal expansion of the moderator usually differs from the coefficient of the surrounding structural material, the core becomes misaligned with respect to the surrounding structure. Secondly, as is well known, materials change dimensionally when subjected to neutron irradiation. Since the neutron flux within a reactor core varies in magnitude from one location to another, the dimensional changes of blocks in the portion of a reactor core in which the neutron flux is highest is greater than the dimensional changes in the blocks located in areas of less neutron activity. Thus, misalignment of the above-mentioned channels results.

The effects of such passageway misalignment are extremely deleterious. Misalignment of a control-rod channel may, in severe cases, cause the control rod to bind, thereby creating the possibility of a severe accident caused by loss of control over the reactor. In the same manner, a fuel element could become lodged within the reactor core causing great inconvenience and expense in the extraction of the element. Moreover, misalignment of coolant channels causes a reduction in the cross-sectional area of the coolant flow path, thereby reducing coolant flow and causing an increase in fuel element temperature, or an increase in pumping requirements. Thus, it can be seen that misalignment of moderator structure is attended by extremely undesirable consequences.

It is, therefore, the general object of the present invention to provide means for maintaining the alignment of moderator block structures in neutronic reactors.

Other objects of the invention will be apparent from an examination of the following description of the invention and the drawings appended thereto, wherein:

FIG. 1 is a view of a moderator structure with the present invention incorporated therein; and FIG. 2 is a detailed view of a single grid intersection of FIG. 1 where a control rod channel penetrates the center of vertically stacked moderator block portions.

In accordance with the present invention, the above-stated object is attained by incorporating a restraining grid between each layer of blocks in a moderator structure, at the top of the uppermost layer, and at the bottom of the bottommost layer. Each grid consists of two groups of rods or bars extending across the core, the groups traversing the core at right angles to each other and being rigidly affixed to each other at their points of intersection. The number of rods and the spacing therebetween is sufficient to provide at least one point of intersection for each moderator block in the block layer adjoining the grid, restraint being accomplished by rigidly attaching each moderator block to the grid intersections immediately above and below it.

Although the grids may be fabricated from any material having sufficient structural integrity to withstand the effects of a reactor environment, the grids are preferably fabricated from a material having a coefficient of thermal expansion equal to the coefficient of thermal expansion of structural materials used elsewhere in the reactor. Moreover, it is preferable to fabricate the grids from a material which is dimensionally stable under neutron irradiation.

To illustrate the invention in greater detail, reference is made to the drawings which show a preferred embodiment. Referring first to FIG. 1, a multiplicity of graphite moderator blocks 1, each of which is provided with several vertically-penetrating channels 2, are stacked in five layers upon an apertured steel supporting plate 3. The blocks are stacked so that channels 2 and the apertures of plate 3 are aligned to provide a series of continuous vertical passageways passing upwardly through the structure. The resultant passageways are adapted to accept control rods, fuel elements, and experimental targets, and to conduct the flow of coolant through the core. Between each layer of blocks, at the bottom of the bottom layer, and at the top of the top layer, there is provided a restraining grid 4 formed from a material having a temperature coefficient of expansion similar to the coefficient of supporting plate 3 (the most obvious material for such use is the same material as is used in supporting plate 3, i.e., steel) and the other structural members which support the moderator structure. Grids 4 consist of a first group of bars or rods 5 traversing the core in one direction and a second group of bars 6 traversing the core at right angles to the first group and attached thereto at each point of intersection 7. The number of bars in each group is equal to the number of rows of moderator blocks in each layer. Thus, there is provided a point of intersection 7 for each block in the layers adjacent to each grid. Circular ring 8 is rigidly affixed to and connects the ends of the bars. In the case of the uppermost grid, however, the bars are rigidly attached to a circular channel 13.

Equally spaced around the periphery of the core and hingedly radially to supporting plate 3 are a multiplicity of vertical alignment members 10. Alignment brackets 11 which are rigidly attached to circular rings 8 engage vertical alignment members 10 and slide up or down the alignment members as the structure expands or contracts in the vertical direction. An apertured top plate 12 is encircled by channel 13 which restrains vertical alignment members 10 by means of T-shaped keys 14 which fit into slots provided at the top of each member 10.

Turning next to FIG. 2, which is a detailed view of a single grid intersection of the moderator structure of FIG. 1 where the center of vertically stacked moderator block portions 1 is penetrated by a control rod channel, moderator block 1 is provided with four coolant channels 2, one in each quadrant, and two slots 16 and 17 which traverse the blocks at right angles to each other and intersect at the major vertical axis of the block. Slots 16 and 17 are adapted to receive bar members 18 and 19, which are part of the grid shown in FIG. 1. The bars are joined at their intersection by a ring 20, which allows the center of the block to be penetrated by a channel which may be used for control rod purposes. Bar members 18 and 19 protrude from the slots 16 and 17 provided in the lower moderator block 1 so that slots 21 and 22 of the upper moderator block also labeled 1 which is immediately above it in the structure will be similarly engaged and restrained. In this manner, each block in the structure is keyed to the block above it and below it, thus joining all layers together and allowing the entire structure to expand and contract in the radial direction in response to temperature changes as if it were entirely fabricated from the material used in the grids. Moreover, a material which is not subject to changes in dimension under neutron irradiation may be used to fabricate the grids, thus eliminating the problems resulting from differential expansion or contraction caused by a non-uniform neutron flux.

Many modifications of and deviations from the embodiment illustrated herein may be made without departing from the scope of the present invention. For example, the grid intersection may be joined to moderator blocks above and below it by pinning it at one point or by any convenient means other than the slot arrangement shown in FIG. 2. Many other changes will be obvious to those skilled in the art. Therefore, the invention should be limited only by the claims appended hereto.

What is claimed is:

1. An improved neutronic reactor moderator structure comprising a perforated bottom supporting plate; a multiplicity of vertical guiding members hinged radially around the periphery thereof, a multiplicity of moderator blocks arranged in horizontal layers thereon forming a multiplicity of vertically-stacked columns, the top and bottom surfaces of each of said blocks being provided with a pair of slots intersecting at right angles at the vertical axis of the block; integral restraining grids disposed between each of said layers of blocks, at the top of the uppermost layer, and at the bottom of the bottommost layer, bracket members attached to the peripheries of said retaining grids, said bracket members engaging said vertical guiding members in order to align said restraining grids, each of said grids comprising a multiplicity of bars, a first portion of which extend in parallel-spaced relationship across said layers in one direction and the remainder of which extend in parallel-spaced relationship in a direction substantially normal to the direction of said first portion, said bars being integrally affixed to each other at their points of intersection and the number of bars being adequate to provide at least one point of intersection for each block in an adjoining layer of blocks; said restraining grids being keyed at each point of intersection to the blocks immediately above and below by means of the slots provided in the top and bottom of the surfaces of said blocks; a perforated top plate covering the uppermost layer of blocks, and means carried by said top plate for maintaining said guiding members in vertical positions.

2. The moderator structure of claim 1 wherein said perforated bottom supporting plate, said perforated top plate, and said restraining grids are fabricated from the same material.

References Cited in the file of this patent

UNITED STATES PATENTS

| | | |
|---|---|---|
| 2,872,398 | Ashley et al. | Feb. 3, 1959 |
| 2,998,370 | Gaunt et al. | Aug. 29, 1961 |
| 3,069,343 | Martin | Dec. 18, 1962 |

FOREIGN PATENTS

| | | |
|---|---|---|
| 1,210,802 | France | Oct. 5, 1959 |
| 1,214,246 | France | Nov. 9, 1959 |

OTHER REFERENCES

Millard: Proceedings of the Second International Conference on the Peaceful Uses of Atomic Energy, vol. 8, November 1958, pages 425–427.

Daniels: Nucleonics, March 1956 (vol. 14, No. 3), page 37.

TID–7564, Gas-Cooled Power Reactors, December 1958, pages 63–69.

Gas-Cooled Reactors, May 1960, pages 67–80, published under the auspices of Journal of the Franklin Institute.

ORO–196, Experimental Gas-Cooled Reactors, May 1959, pages 3.6–3.9 (section 3.3), including FIG. 3.3.